United States Patent
Keto et al.

(10) Patent No.: US 8,863,933 B2
(45) Date of Patent: Oct. 21, 2014

(54) CONVEYOR FOR A SHEET GLASS TEMPERING FURNACE

(71) Applicant: Glaston Services Ltd. Oy, Tampere (FI)

(72) Inventors: Kyösti Keto, Vesilahti (FI); Kalevi Anttonen, Tampere (FI)

(73) Assignee: Glaston Services Ltd. Oy, Tampere (FI)

( * ) Notice: Subject to any disclaimer, the term of this patent is extended or adjusted under 35 U.S.C. 154(b) by 0 days.

(21) Appl. No.: 13/943,171

(22) Filed: Jul. 16, 2013

(65) Prior Publication Data
US 2014/0021013 A1 Jan. 23, 2014

(30) Foreign Application Priority Data
Jul. 18, 2012 (FI) .................................... 20125805

(51) Int. Cl.
| | |
|---|---|
| *B65G 13/00* | (2006.01) |
| *B65G 13/02* | (2006.01) |
| *C03B 35/18* | (2006.01) |
| *B65G 37/00* | (2006.01) |
| *C03B 35/24* | (2006.01) |
| *C03B 35/16* | (2006.01) |
| *C03B 29/12* | (2006.01) |

(52) U.S. Cl.
CPC ............... *B65G 37/00* (2013.01); *B65G 13/02* (2013.01); *C03B 35/18* (2013.01); *C03B 2225/02* (2013.01); *C03B 35/189* (2013.01); *C03B 35/24* (2013.01); *C03B 35/16* (2013.01); *C03B 29/12* (2013.01)
USPC .......................................... 193/35 R; 65/106

(58) Field of Classification Search
CPC ........ B65G 13/12; B65G 13/08; B65G 39/10; B65G 39/12; C03B 13/00; C03B 13/04; C03B 13/16; C03B 23/033; C03B 23/004
USPC .......... 198/782; 193/35 R, 37; 65/253, 370.1, 65/104, 106, 107, 268, 287
See application file for complete search history.

(56) References Cited

U.S. PATENT DOCUMENTS

| | | | |
|---|---|---|---|
| 3,223,499 A | 12/1965 | Cypher et al. | |
| 3,300,290 A | 1/1967 | Misson | |
| 3,409,422 A | 11/1968 | Gulotta | |
| 4,054,438 A * | 10/1977 | Presta ............................. | 65/107 |

(Continued)

FOREIGN PATENT DOCUMENTS

FI 115768 B 7/2005

OTHER PUBLICATIONS

Search Report issued Aug. 1, 2013, by the Finnish Patent Office in corresponding Finnish Patent Application No. 2125805. (2 pages).

*Primary Examiner* — James R Bidwell
(74) *Attorney, Agent, or Firm* — Buchanan Ingersoll & Rooney PC

(57) ABSTRACT

A conveyor for a sheet glass tempering furnace, comprising a roller conveyor and an inclined airborne conveyor, as well as support and transport rollers at a lower edge of the airborne conveyor. The roller conveyor includes a horizontal level conveyor and an adapter conveyor between the horizontal level conveyor and the airborne conveyor. The adapter conveyor features a horizontal level upstream end and an inclined downstream end, the inclination angle of which matches substantially that of the airborne conveyor. The adapter conveyor has its rollers increase in inclination step by step when proceeding from the up-stream end towards the downstream end.

14 Claims, 5 Drawing Sheets

(56) References Cited

U.S. PATENT DOCUMENTS

| | | | |
|---|---|---|---|
| 4,292,065 A * | 9/1981 | Nedelec et al. | 65/104 |
| 4,556,406 A | 12/1985 | Kahle | |
| 6,843,074 B2 * | 1/2005 | Nemugaki et al. | 65/285 |
| 7,497,096 B2 * | 3/2009 | Asai et al. | 65/370.1 |
| 8,302,429 B2 * | 11/2012 | Nomura et al. | 65/106 |
| 2004/0261456 A1 | 12/2004 | Asai et al. | |
| 2005/0061032 A1 * | 3/2005 | Yoshizawa | 65/106 |
| 2006/0144090 A1 * | 7/2006 | Yoshizawa | 65/104 |
| 2006/0179885 A1 | 8/2006 | Reunamaki et al. | |

* cited by examiner

CONVEYOR FOR A SHEET GLASS TEMPERING FURNACE

The invention relates to a conveyor for a sheet glass tempering furnace, comprising a roller conveyor and an inclined airborne conveyor, as well as support and transport rollers at a lower edge of the airborne conveyor.

This type of conveyor is known from patent publication U.S. Pat. No. 3,223,499. There, the roller conveyor is set across its full extent at the same inclination angle as the airborne conveyor. This provides unhindered passage for a glass sheet from the roller conveyor onto the airborne conveyor. Since the roller conveyor for a continuous furnace has a considerable length, even a slight tilt angle causes drifting of the glass sheet to a lower edge of the roller conveyor. In order to avoid such an event, and in order to guide the edge of a glass sheet to rest upon the airborne conveyor's support and transport rollers, the roller conveyor has its rollers equipped with guide skirts which are in alignment with the support and transport rollers. However, the guide skirts may damage the edge of glass by grinding. Some grinding occurs because the internal surface of a guide skirt, which the lower edge of glass is partly leaning against, has a peripheral speed slightly other than the motion speed of a glass sheet. The difference in speeds is caused by a difference in diameters between the roller and the skirt. The motion speed of glass is determined by a diameter-specific peripheral speed of the roller and the peripheral speed of a guide skirt's internal surface is slightly higher. In addition, the rollers equipped with guide skirts are expensive.

It is an objective of the invention to provide an improved conveyor for a sheet glass tempering furnace, wherein the above drawback is substantially mitigated or eliminated. A second objective of the invention is to provide a conveyor which is also applicable in existing furnaces equipped with horizontal roller conveyors.

These objectives are achieved with the invention on the basis of characterizing features presented in the appended claim 1. Preferred embodiments of the invention are presented in the dependent claims. The invention will now be described in more detail with reference to the accompanying drawings, in which FIG. 1 shows schematically in a side view a sheet glass tempering furnace equipped with a conveyor according to one embodiment of the invention;

Figure 1:
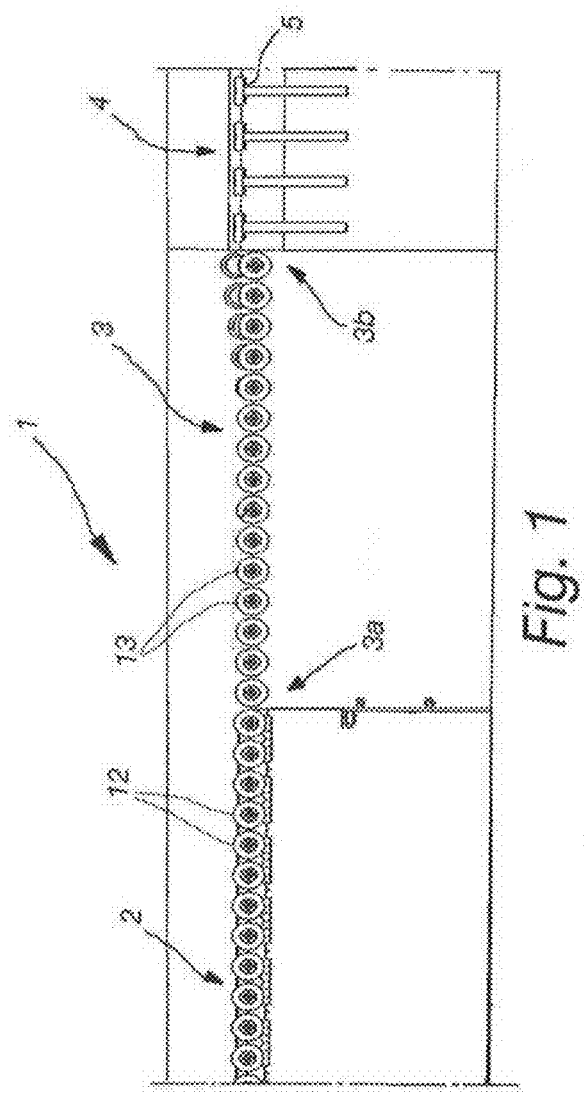

FIG. 1 shows schematically a sheet glass tempering furnace 1, comprising several successive sections in which the glass sheet warms up gradually when proceeding from left to right. Upstream furnace sections, a plurality of which can be provided in succession, contain a roller conveyor 2 present in horizontal level (hereinafter a horizontal level conveyor). Accordingly, the horizontal level conveyor 2 has its rollers 12 in a horizontal position. Downstream of the horizontal level conveyor is an adapter conveyor 3, which is another roller conveyor. The adapter conveyor 3 is followed by an inclined airborne conveyor 4 having its lower edge provided with support and transport rollers 5. The airborne conveyor 4 must be slightly inclined (e.g. 1.5 degrees), such that the glass sheet does not drift uncontrollably but leans sufficiently against the support and transport rollers 5, which carry the glass sheet forward at a desired speed. The structural members of an airborne conveyor are prior known as such and need not be further explained in this context.

Figure 2:
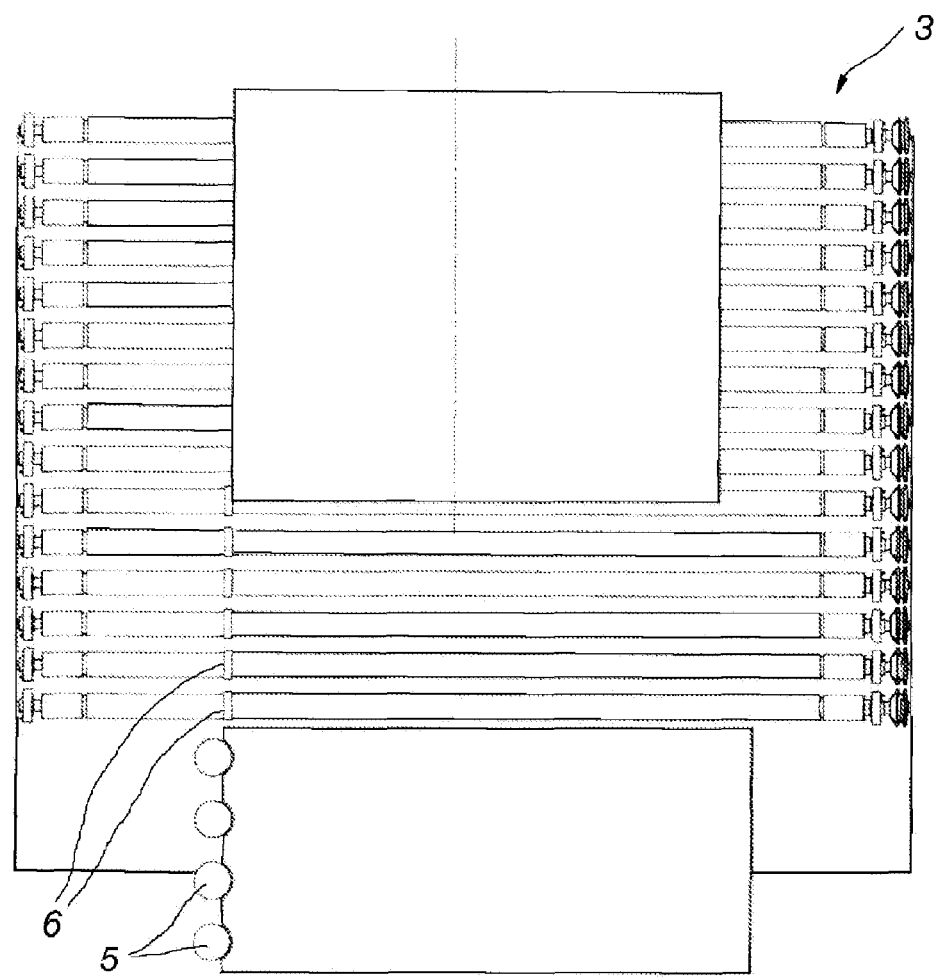
FIG. 2 shows an essential segment of the conveyor in a plan view.
Figure 3:
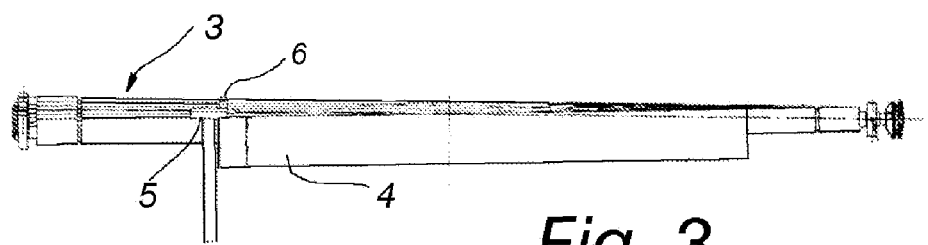
FIG. 3 shows the conveyor segment of FIG. 2 in a front view.
Figure 4:
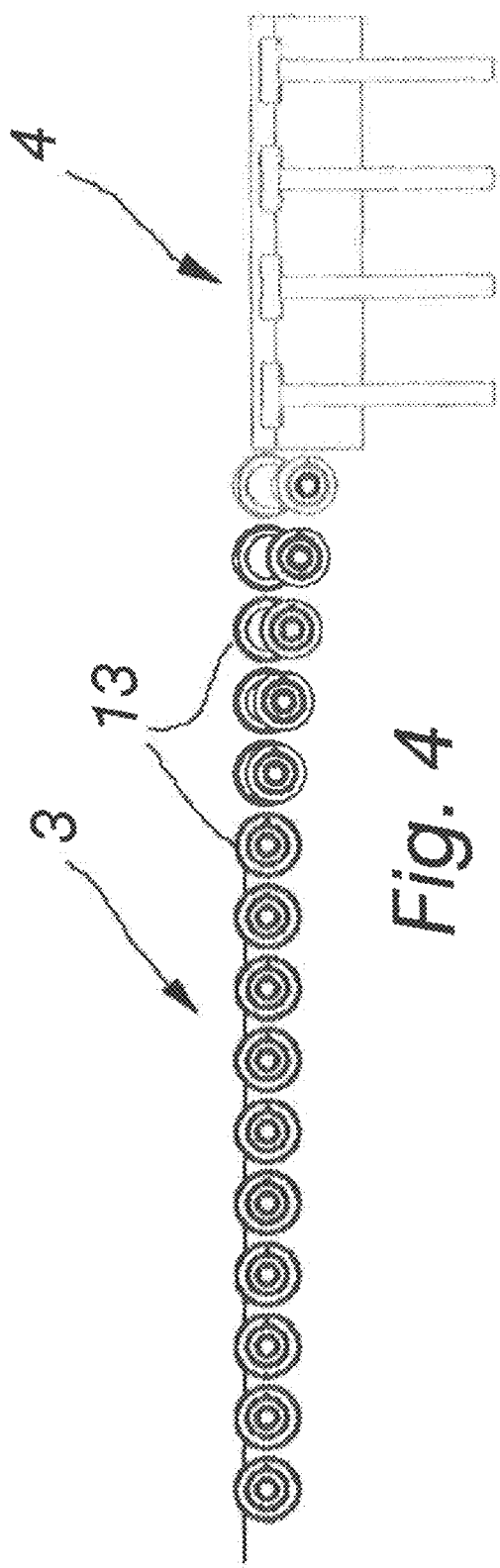
FIG. 4 shows the same conveyor segment in a side view.
Figure 5:
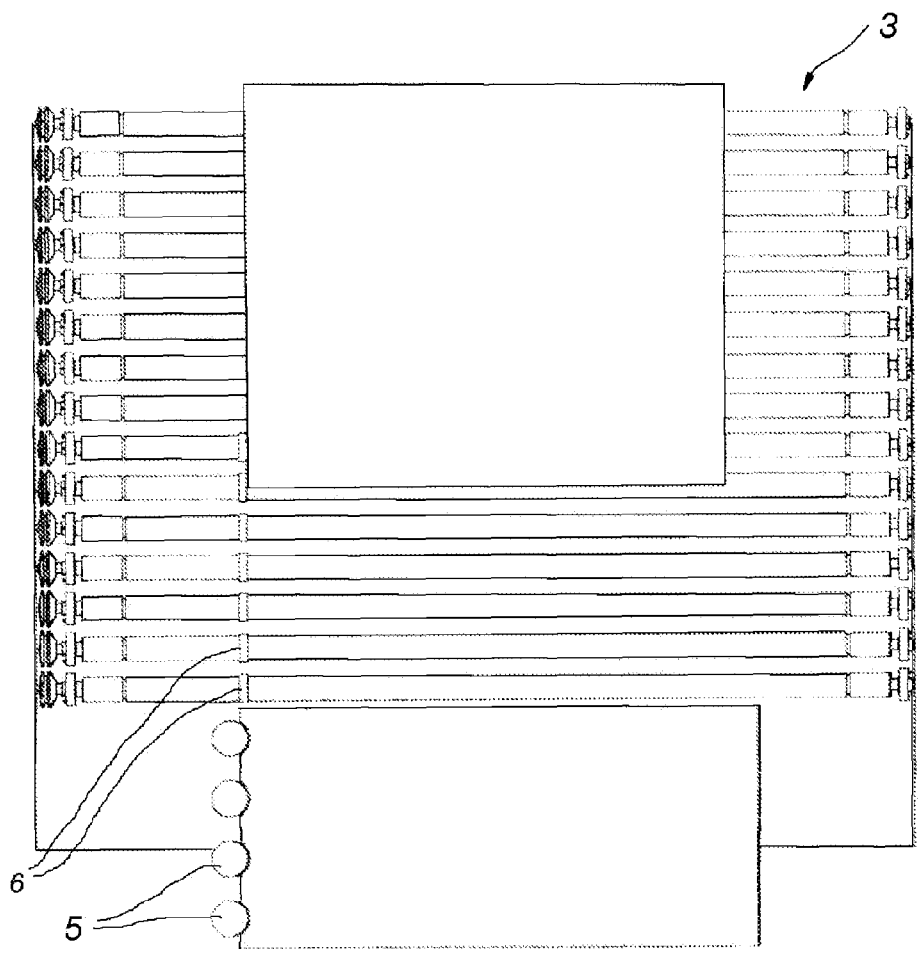
FIGS. 5, 6 and 7 show respectively in plan, front and side views a conveyor according to a second embodiment of the invention.
Figure 6:
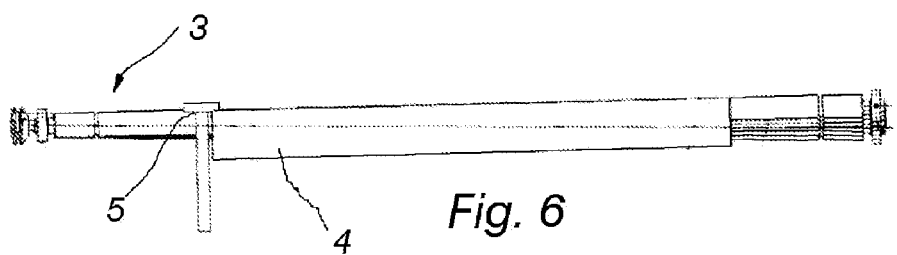
Figure 7:
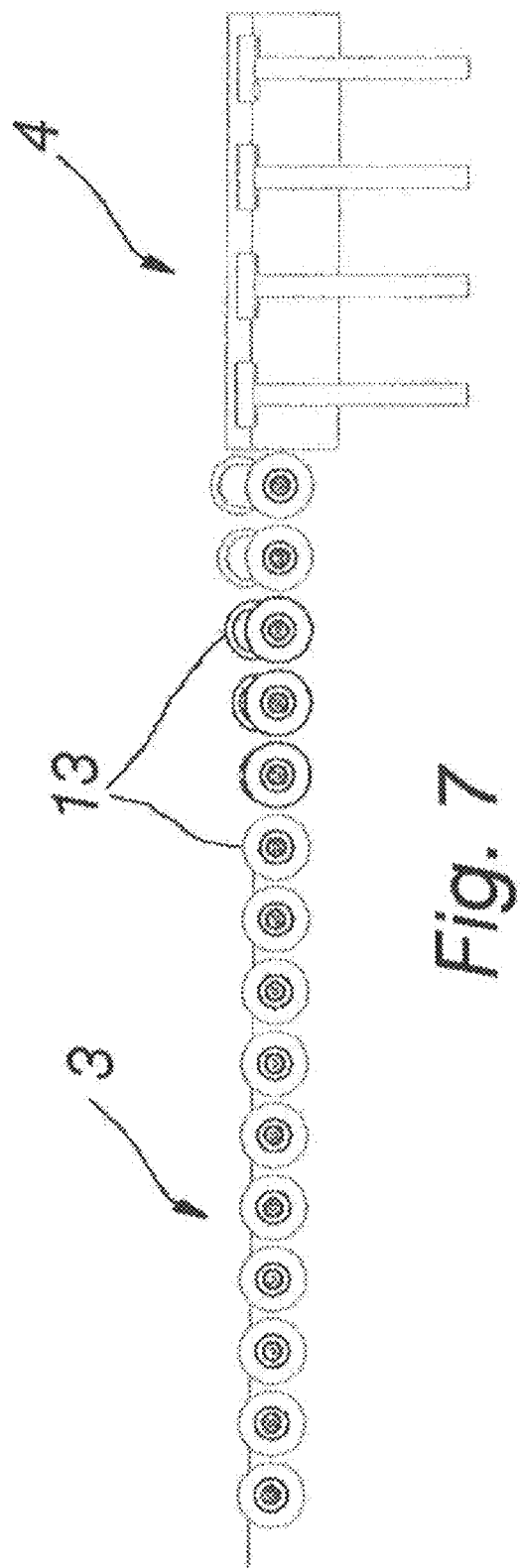

The adapter conveyor 3 has a task of passing a glass sheet from the horizontal level conveyor 2 onto the inclined airborne conveyor 4. Therefore, the adapter conveyor 3 features a horizontal level upstream end 3a and an inclined downstream end 3b. The downstream end 3b has an inclination angle which substantially matches that of the airborne conveyor 4. The adapter conveyor 3 has the inclination of its rollers 13 increasing step by step when proceeding from the upstream end 3a towards the downstream end 3b. There are several options to implement this increase of inclination. The adapter conveyor 3 can have the inclination of its rollers 13 increasing in a downward direction as depicted in FIGS. 2-4. Alternatively, the rollers 13 can have an inclination which increases in an upward direction as shown in FIGS. 5-7. In the former case, the horizontal level conveyor 2 has its transport level in flushness with an upper edge of the airborne conveyor 4. In the latter case, the horizontal level conveyor 2 has its transport level in flushness with a lower edge of the airborne conveyor 4. In a third option, the adapter conveyor 3 has the inclination of its rollers 13 increasing in such a way that the rollers' midsection remains on the same horizontal line, whereby the rollers have first ends ascending step by step and opposite ends descending step by step. In this case, the horizontal level conveyor 2 has its transport level at the same height as the midsection of the airborne conveyor 4. When comparing height differences between the conveyors 2 and 4, it must be considered that a glass sheet on the airborne conveyor 4 is slightly elevated off the surface of the conveyor 4.

The adapter conveyor 3 has a length which is not more than 50%, preferably not more than ⅓ of that of the horizontal level conveyor 2. The adapter conveyor 3 has its inclined rollers preferably provided also with guide skirts 6, which are in alignment with the airborne conveyor's support and transport rollers 5.

Hence, the guide skirts, which constitute a source of the above-mentioned problems, are only present along a small portion of the length of the roller conveyor 2, 3. The guide skirts 6 can be replaced with support and guide wheels, which are present on the rollers of the adapter conveyor 3 and the rotation axes of which are perpendicular to the rollers 13. These support and guide wheels are basically similar to the support and transport rollers 5 of the airborne conveyor 4. The shafts thereof extend through gaps between the rollers, nor are they necessarily needed in every inter-roller space. Such support and guide wheels can be either freely rotating or driven and are in alignment with the airborne conveyor's support and transport rollers 5.

Thus, the adapter conveyor 3 constitutes a part of the roller conveyor 2, i.e. the conveyors 2 and 3 are included in the same tempering furnace, i.e. the regions of both conveyors have substantially the same temperature.

The invention claimed is:

1. A conveyor for a sheet glass tempering furnace, comprising:
a roller conveyor and an inclined airborne conveyor, and support and transport rollers at a lower edge of the airborne conveyor,
wherein the roller conveyor includes a horizontal level conveyor and an adapter conveyor between the horizontal level conveyor and the airborne conveyor, the adapter conveyor having a horizontal level upstream end and a transverse direction to a transport direction of the sheet glass inclined downstream end , an inclination angle of said downstream end matching substantially that of the airborne conveyor, and the adapter conveyor having an inclination of its rollers increasing step by step by having first ends ascending step by step and/or opposite ends descending step by step when proceeding from the upstream end towards the downstream end.

2. A conveyor as set forth in claim 1, wherein the adapter conveyor has a length which is not more than 50% of that of the horizontal level conveyor.

3. A conveyor as set forth in claim 1, wherein the adapter conveyor has the inclination of its rollers increasing in a downward direction.

4. A conveyor as set forth in claim 1, wherein the inclined rollers are provided with guide skirts, which are in alignment with the airborne conveyor's support and transport rollers.

5. A conveyor as set forth in claim 1, wherein on top of the adapter conveyor's inclined rollers are support and guide wheels, the rotation axes of which are substantially perpendicular to the rollers, and the support and guide wheels are in alignment with the airborne conveyor's support and transport rollers.

6. A conveyor as set forth in claim 1, wherein the adapter conveyor has the inclination of its rollers increasing in an upward direction.

7. A conveyor as set forth in claim 1, wherein the adapter conveyor has the inclination of its rollers increasing in such a way that the rollers' midsection remains on the same horizontal line, i.e. when proceeding in the conveying direction, the rollers have first ends ascending while the opposite ends thereof are descending.

8. A conveyor for a sheet glass tempering furnace, comprising:
a roller conveyor and an inclined airborne conveyor, said inclined airborne conveyor including support and transport rollers at a lower edge thereof, said roller conveyor including a horizontal level conveyor and an adapter conveyor extending between the horizontal level conveyor and the airborne conveyor,
wherein the adapter conveyor has a horizontal level upstream end and an inclined downstream end, an inclination angle of said downstream end matching substantially that of the airborne conveyor, and the adapter conveyor has the inclination of its rollers increasing step by step when proceeding from the upstream end towards the downstream end.

9. A conveyor as set forth in claim 8, wherein the adapter conveyor has a length which is not more than 50% of that of the horizontal level conveyor.

10. A conveyor as set forth in claim 8, wherein the adapter conveyor has the inclination of its rollers increasing in a downward direction.

11. A conveyor as set forth in claim 8, wherein the inclined rollers are provided with guide skirts, which are in alignment with the airborne conveyor's support and transport rollers.

12. A conveyor as set forth in claim 8, wherein on top of the adapter conveyor's inclined rollers are support and guide wheels, the rotation axes of which are substantially perpendicular to the rollers, and the support and guide wheels are in alignment with the airborne conveyor's support and transport rollers.

13. A conveyor as set forth in claim 8, wherein the adapter conveyor has the inclination of its rollers increasing in an upward direction.

14. A conveyor as set forth in claim 8, wherein the adapter conveyor has the inclination of its rollers increasing in such a way that the rollers' midsection remains on the same horizontal line, i.e. when proceeding in the conveying direction, the rollers have first ends ascending while the opposite ends thereof are descending.

* * * * *